Dec. 31, 1957 C. E. MANHART 2,818,042
SEA ANCHOR
Filed Aug. 29, 1955 2 Sheets-Sheet 1
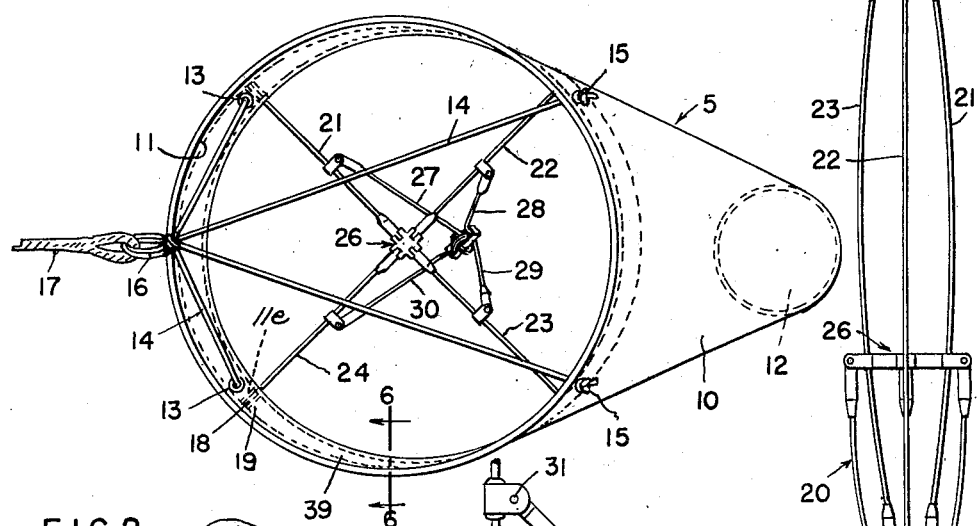
FIG.1.
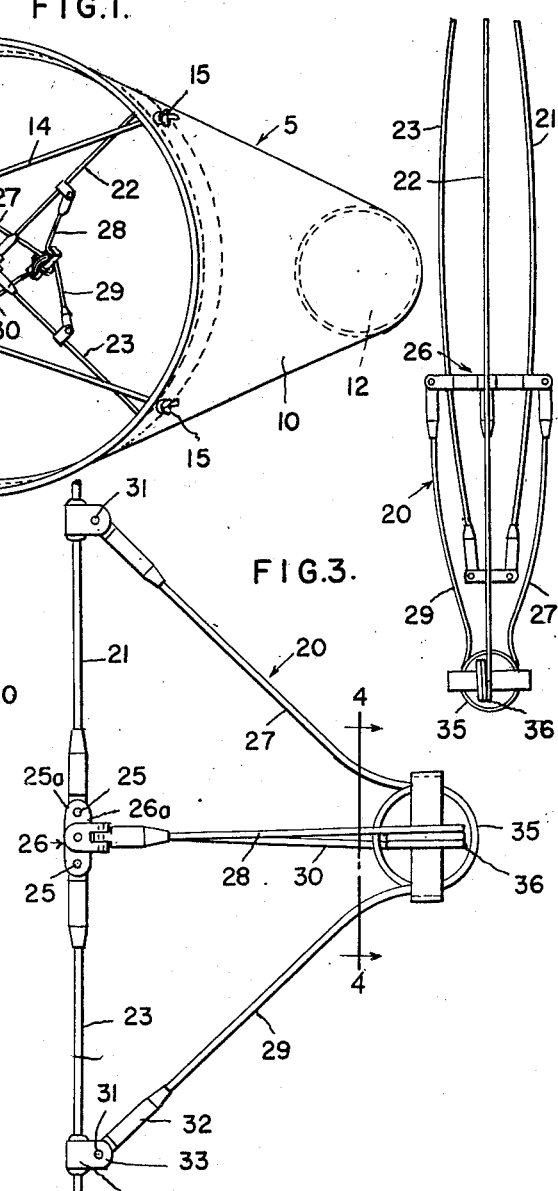
FIG.5.
FIG.3.
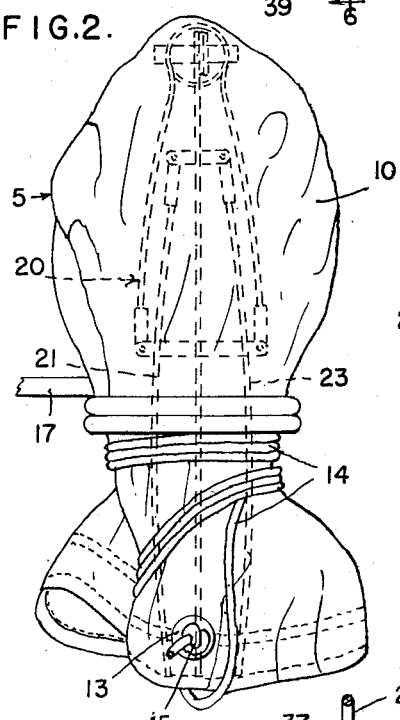
FIG.2.
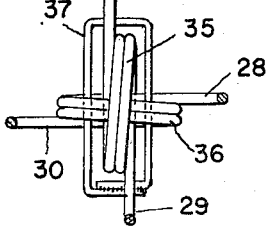
FIG.4.
INVENTOR:
Charles E. Manhart
BY
Arthur Middleton
atty.

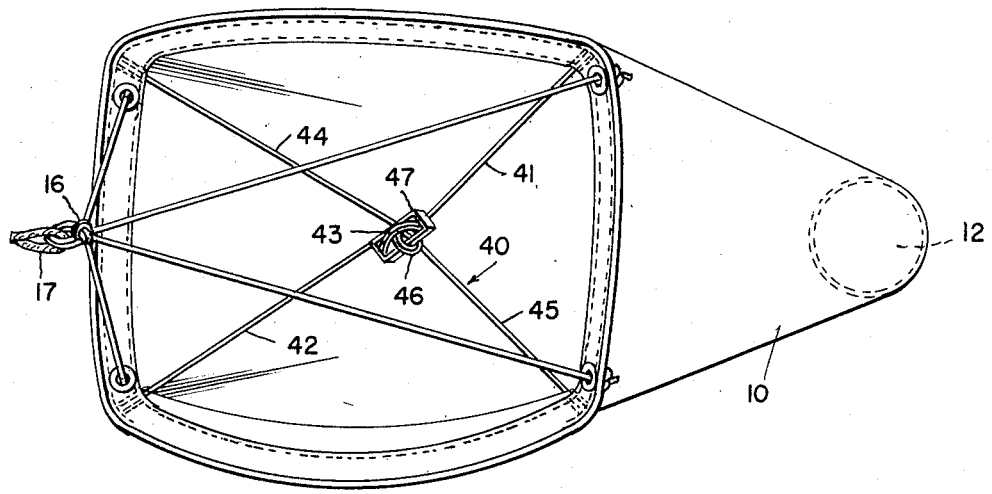
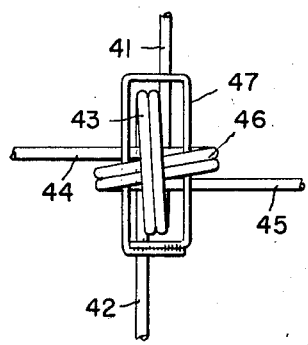
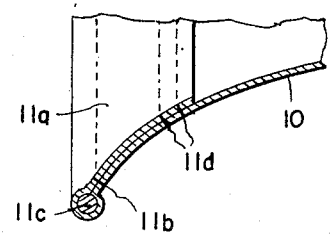
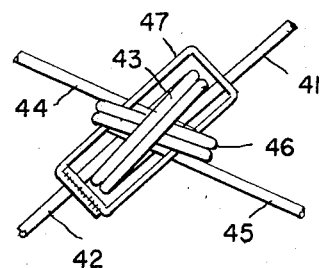

United States Patent Office 2,818,042
Patented Dec. 31, 1957

2,818,042

SEA ANCHOR

Charles E. Manhart, Miami, Fla.

Application August 29, 1955, Serial No. 531,235

2 Claims. (Cl. 114—209)

This invention relates to sea anchors or drags, and more particularly to devices of the type used with survival-at-seat equipment such as life-rafts, or the like.

When an aircraft, for example, is ditched or crashes at seat, it is sometimes the case that automatically released life-rafts drift or are blown out of reach of survivors before the raft can be boarded. The main cause of this loss of rafts before boarding is the failure of sea anchors provided therewith to function properly.

Conventional sea anchors as used with survival-at-sea equipment often fail to open, with the result that they float on the surface of the water and serve no dragging function upon the attached equipment.

Conventional sea anchors of the "umbrella" type, furthermore, suffer the disadvantage of collapsing should the raft to which the anchor is attached move backwards towards the anchor, thereby causing slack in the connecting line. Since most conventional sea anchors are held open solely by the tension caused by water pressure created through motion of the raft away from the anchor, it will be evident that when the line goes slack the tension is relieved and the anchor collapses.

The principal object of the invention is to provide an improved form of sea anchor having a positively opening frame structure, functioning so that the anchor will spring fully open immediately upon release, to perform its drag function.

Another object of the invention is to provide a sea anchor of the character indicated, and constructed so that it will remain positively open in use without tendency to collapse in the event that slack occurs in the line connecting the same to the life-raft or other equipment with which it may be used.

Still another object of the invention is to provide a sea anchor of the aforesaid character, so constructed as to assure its quick and substantially immediate submergence when thrown into the water and to assure, likewise, the scooping of water into the anchor for the proper performance of its drag function.

Still another object of the invention resides in the provision of a sea anchor as above set forth and and embodying a frame structure constructed for use in making a sea anchor which will have a substantially square mouth, or one having its mouth of substantially oblong shape.

Briefly stated, the foregoing objects of the invention may be achieved by forming the sea anchor with its body or drag member substantially in the shape of a truncated cone, mounted on an expansible frame comprising spring-loaded supporting arms connected to the body member and arranged so as not only to be positive in action for opening the anchor, but also so as to form at the mouth of the anchor, when open, a lip depending angularly and outwardly with respect to the longitudinal axis of the cone and effective, when the anchor enters the water, for cutting into the water, thereby causing quick submergence of the anchor. Furthermore, in accordance with the invention, the supporting arms are arranged in pairs, the spring which serves the arms of one pair being positioned interiorly of the spring which serves the arms of the other pair, the springs being held in adjustable relation to one another by means of a connector element, whereby the springs can have freedom of movement with respect to one another when the frame is being expanded and collapsed, and for the purpose of making a sea anchor having its mouth, when open, of substantially oblong shape or of substantially square shape, as may be desired.

The invention and the features and advantages thereof will be more readily apparent from the detailed description given below, and from the accompanying drawings in which:

Fig. 1 is a view, in perspective, of one form of sea anchor embodying invention, in its open and operative condition;

Fig. 2 is a side view of the anchor in collapsed, closed condition, as for storing;

Fig. 3 is a fragmentary view of the frame portion of the anchor in this embodiment, when in its expanded position;

Fig. 4 is a fragmentary detail view showing the arrangement of the springs, and taken along the line 4—4 of Fig. 3;

Fig. 5 is a view showing the frame portion of this embodiment, as it appears when in its closed or folded-up position;

Fig. 6 is a fragmentary view in cross-section, showing the lip formed at the mouth of the anchor when open; taken along line 6—6 of Fig. 1;

Fig. 7 is a view, similar to Fig. 1, showing another embodiment of the invention;

Fig. 8 is a fragmentary detail view, showing the relative arrangement of the springs in this embodiment, in one position thereof; and Fig. 9 is a similar view, but showing these parts in another position thereof.

Referring first particularly to Figs. 1 to 6, the sea anchor therein illustrated is indicated generally by the numeral 5. As shown, the anchor comprises a body or drag portion 10, the latter being preferably made of opaque, rubberized nylon or similar fabric, and being formed to provide at one end thereof the mouth 11 which is substantially round in shape, and at its opposite end, the smaller outlet 12, whereby it is in the shape substantially of a truncated cone.

Along the mouth 11, the fabric is folded inwardly to provide a hem 11a, the latter being stitched adjacent the outer end thereof, as indicated at 11b to provide an enclosure along the periphery of the mouth, for the reception of a reinforcing cord or the like 11c. The hem 11a is also stitched adjacent the inner end thereof, as indicated at 11d. Eyelets 13, reinforced in any suitable fashion, are formed in the hem, these eyelets being spaced at distances from one another, depending upon the shape which the mouth of the anchor will take when open, such that they will preferably be located adjacent the corners of the mouth of the anchor when it is open. These eyelets receive the lines 14, knotted as at 15 exteriorly of the eyelets. Lines 14 may be looped and knotted as at 16 for attachment thereto of a connecting line 17 leading to a raft or the like (not shown). The hem 11a is also stitched transversely thereof as indicated at 11e in Fig. 1 to provide pockets 18 located at points which will constitute the corners of mouth 11 when the sea anchor is open.

Referring particularly to Fig. 3 of the drawings, the frame supporting member in this embodiment is indicated generally at 20. As shown, the frame comprises rods 21—24, each pivotally connected at its enlarged inner end to a central hub 26, as by a pin 25 extending through an ear 25a formed therein and through radially extending ears 26a on the hub 26. Thus, in the open, i. e., expanded, position of the frame, the rods 21—24 are disposed substantially at right angles to one another. The rods are of sufficient length to enable the outer ends thereof to be received and securely fastened within the pockets 18.

Spring arms 27—30 are pivotally attached to frame rods 21—24, respectively, as by pins 31 passing through ears formed at the enlarged outer ends 32 of arms 27—30 and through ears 33 formed on lugs 34 secured to the arms 21—24.

Each pair of the oppositely disposed spring arms 27, 29 and 28, 30 is preferably formed from a single piece of relatively heavy wire, the latter being wound centrally thereof to provide a spring coil for constraining the arms of the respective pairs to the position shown in Figs. 1 and 3. Thus, one pair of oppositely disposed spring arms 27, 29 may be under the influence of spring coil 35, while the other pair 28, 30 is under influence of spring coil 36. As will be noted, the diameter of one of the spring coils is larger than that of the other, so that the latter may be positioned for limited, relatively free angular movement interiorly of the former. Thus, as shown, coil 36 is located interiorly of coil 35, with its axis extending generally at a right angle to that of coil 35. To retain the two coil springs in position yet permit limited freedom of movement of one relative to the other, a connector 37, preferably in the form of a closed strap or band of rectangular outline is mounted so as to loosely surround the larger of the two coils (as coil 35) and so as to have its two longer sides extended through the smaller of the two coils (as coil 36).

Thus, when the anchor is in folded-up or stored condition, the frame parts will occupy the relative positions substantially as shown in Fig. 5. In that position, the spring arms 27, 29 lie in relatively close proximity substantially parallel to one another, and are under tension of the spring coil 35, while arms 28, 30 are similarly positioned, but under the tension of spring coil 36. Hence, each of the rods 21—24 is likewire positioned in close proximity to its oppositely disposed rod and under the tension of the associated spring coil 35 or 36. While the anchor is in the thus stored or folded condition, hub 26 is disposed intermediate the arms 27—30, somewhat adjacent the coils 35, 36 and in a plane substantially at a right angle to the planes of the latter. As shown in Fig. 2, the sea anchor may be retained in its collapsed or folded-up position by coiling the connecting line 17 around its exterior.

When the anchor is released from its folded or stored condition and cast into the water, line 17 will become uncoiled from the exterior of the anchor, thus relieving the tension under which the spring arms 27—30 are held while in the closed or collapsed condition. As a result of the release of this tension, the spring arms instantly move outwardly from one another and thereby, through their connection with the rods 21—24, force the latter to occupy positions substantially in a common plane, as shown in Figs. 1 and 3. With this expansion of the frame upon release of the tension on spring arms 27—30, there results a positive and instantaneous opening of the mouth 11 of the anchor, thus conditioning the anchor immediately to perform its intended function. When open, the mouth of entrance of the anchor though actually round, takes a substantially square shape due to the construction of the frame and its connection with the body member 10 by means of the arms 21—24. As a result, there is formed an extending lip 39 which depends angularly and outwardly, owing to the presence of body fabric of a length in excess of the straight line distance between the fixed points at which two adjacent arms of the frame are connected thereto.

Once anchor 5 is open, it will remain in that condition, due to the novel arrangement of the spring arms 27—30 and the frame rods 21—24 until positive action is taken to close the anchor and render it inoperative. In use, such action may consist of hauling in on line 17 until the anchor is within reach, removing the anchor from the water and then folding the frame rods 21—24 inwardly toward each other and coiling the line 17 around the exterior of the folded anchor.

In Figs. 7 to 9 there is shown another embodiment of the invention. In these figures, parts corresponding to those of the embodiment illustrated in Figs. 1 to 6 are identified by the same reference characters.

As will be seen from Fig. 7, the sea anchor in this embodiment has its mouth substantially of oblong shape when open, thus tending to accentuate the lip 39 formed at the mouth of the anchor. In this embodiment there is utilized an expansible frame which is of somewhat simpler construction than in the embodiment previously described. This frame member, indicated generally by the numeral 40 differs from frame 20 of the other embodiment in that the rods 21—24 are omitted, the oppositely disposed arms 41, 42 of the spring coil 43, and likewise the oppositely disposed arms 44, 45 of spring coil 46 being directly connected with the body member 11. As in the other embodiment, spring coil 46 is of smaller diameter than spring 43 and held in adjustable relation therewith by the connecting strap 47 extending around the coil 43 and having its sides positioned interiorly of the coil 46. With this construction of the frame member, the spring coils 43, 46, arms 41—44 and strap member 47 will, when the anchor is closed, occupy the relative positions substantially as shown in Fig. 8. On the other hand, when the anchor of this embodiment is open and released for operative condition, the coils, arms and connecting strap will assume angular positions relative to one another substantially as shown in Fig. 9.

As will now be apparent, the sea anchor of my invention will instantly perform its drag function upon being released from its folded or stored condition from a raft or the like, and will continue to do so under any circumstances until retrieved from the water. Not only is the anchor of my invention positive in its opening action owing to the spring construction of the frame member, but it is likewise held open without tendency to collapse.

Furthermore, it also scoops into the water, and immediately submerges therein when it is cast overboard, and continues to scoop water into the anchor, owing to the cutting action of the depending lip formed at the mouth of the anchor when open. As pointed out above, these advantages accrue whether the construction is one wherein the mouth of the sea anchor is of oblong or of square shape when open.

The size of the mouth opening and of the outlet opening will be governed by the size of the raft or other floating structure with which it is used. For a five-man liferaft, for example, the mouth opening may be seven inches in diameter, outlet opening 12 may be two inches in diameter, and the overall length of the anchor may be approximately eight feet. For a 24-man raft, the diameter of the mouth opening may be twenty inches, while the diameter of the outlet opening may be four inches, and the overall length approximately three feet.

Although my invention has been particularly described with respect to its use with survival-at-sea equipment, it will be evident that it may also be utilized in connection with other floating structures such as pleasure vessels of small size, particularly outboard motor boats.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within the metes and bounds of the claims or form their functional as well as conjointly cooperative equivalents, are therefore intended to be embraced by those claims.

Having described my invention, what I claim is:

1. A sea anchor of the character described, including a body member of flexible material, and an expansible supporting frame for the body member, the body member being of the general shape of a truncated cone, and said frame comprising a hub disposed centrally of the mouth of the body member when the latter is in open position, two pairs of oppositely disposed arms extending from the hub to the mouth of the body member and secured at their outer ends thereto, said pairs of arms being disposed in planes at right angles to each other and each of the arms being pivotally connected at its inner end to the hub to be swung in a plane paralleling the axial centers of the hub and body member, said arms being adapted to occupy a collapsed position relatively close together substantially parallel to one another within the body member outwardly of the hub, and the arms being movable from such collapsed position away from each other to an open position extending in substantially a common plane, and means for each pair of said arms located within the body member acting to force the arms from collapsed position to open position, said means comprising a coil spring and a pair of arms joined to opposite ends of the coil spring and extending therefrom in outward diverging relation, each arm of said last mentioned pair of arms at its outer end being pivotally connected to one of the first mentioned arms intermediate the ends thereof.

2. A sea anchor as defined in claim 1, wherein the mouth of the body member is substantially circular and is supported by the expanded frame to extend in generally square form with an outwardly angularly extending water-scooping lip portion between the ends of two of the supporting arms that are secured at their outer ends to the mouth of the body member.

References Cited in the file of this patent

UNITED STATES PATENTS

| | | |
|---|---|---|
| 965,361 | Barnes | July 26, 1910 |
| 1,277,892 | Evans | Sept. 3, 1918 |
| 1,705,854 | Coughlin | Mar. 19, 1929 |

FOREIGN PATENTS

| | | |
|---|---|---|
| 550,546 | Great Britain | Jan. 13, 1943 |